Feb. 7, 1967 — J. H. NYDAM — 3,302,759

TRANSMISSION AND BRAKE

Filed May 23, 1962

INVENTOR.
JOHN H. NYDAM

United States Patent Office 3,302,759
Patented Feb. 7, 1967

3,302,759
TRANSMISSION AND BRAKE
John H. Nydam, North Uxbridge, Mass., assignor, by mesne assignments, to Whitin Machine Works, Inc., Whitinsville, Mass., a corporation of Massachusetts
Filed May 23, 1962, Ser. No. 197,123
5 Claims. (Cl. 192—4)

This invention relates to braking apparatus, and more particularly to means for preventing backlash or reverse rotation of a driven rotating element when driving power is removed.

In machinery having rotating and other moving parts, the character of the machine elements and the linkages therebetween, together with variations in dimensions of parts, often give rise to undesirable reverse motion, or backlash, when driving power is removed. As a result, irregularities and inaccuracies may be introduced by the machinery which renders the product imperfect or entirely unacceptable.

For example, in a combing machine for textile fibers wherein a fleece of fibers is engaged by the needles of a comb cylinder, removal of driving power may be followed by a reverse rotation of the comb shaft of as much as 20°. This causes the portion of the fleece immediately in front of the nippers to turn back upon itself and entangle the fibers in the needles of the comb cylinder. When the machine is restarted, the entangled fibers produce irregularities in the web delivered by the detaching rolls, and sometimes damages the needles of the comb cylinder itself.

Accordingly, it is the principal object of the present invention to provide improved apparatus for preventing undesired reverse rotation of a machine element which is normally rotated in one direction.

An additional object of the invention is to provide improved brake means for preventing undesired backlash of the comb cylinder of a combing machine.

In accordance with the present invention, the brake means is supported on the machine frame in any suitable manner in non-slip engagement with the rotating machine element whose reverse rotation it is desired to eliminate. The element-engaging member of the brake means is mounted on the movable portion of a one-way braking device such as an overrunning or sprag clutch, or similar mechanism, which permits it to freely rotate in one direction and locks it against rotation in the opposite direction. The direction of free rotation of the braking device is selected to correspond with the direction of normal rotation of the machine member. When drive power to the machine element is stopped, backlash is prevented by its non-slip coupling to the brake means, which cannot rotate in the reverse direction because of the one-way action of the braking device clutch. The apparatus is simple in construction and effectively prevents undesired reverse rotation without interfering with normal operation.

The foregoing and other objects, features and advantages of the present invention will become more apparent from the following more detailed description thereof, when taken in conjunction with the following drawings in which.

Figure 1:
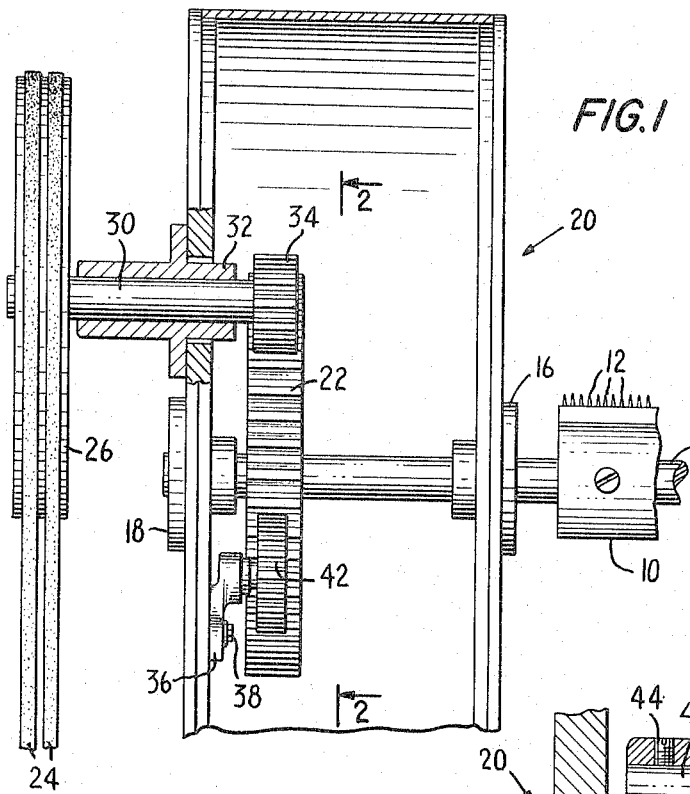
FIGURE 1 is a partial section taken through a portion of a combing machine illustrating the application of the present invention thereto.

Referring now to FIGURE 1, a comb cylinder 10 having needles 12 secured on its peripheral surface in conventional manner, is secured to a shaft 14, by means of a key or the like, for rotation therewith. The shaft 14 is rotatably mounted in bearings 16 and 18 provided in the respective side walls of a housing indicated generally at 20.

Secured to the shaft 14 in driving relation thereto is a gear 22. Driving power for the assembly is derived from a motor (not shown) coupled by means of belts 24 to a pulley 26, which is affixed to shaft 30. The latter is journaled in bearing 32 provided in the wall of the housing 20 and also carries a pinion gear 34 at its inner end. The gear 34 meshes with gear 22 in driving relationship therewith. As can be seen, operation of the motor will drive the pinion 34, which in turn will rotate the gear 22 and thus the comb cylinder 10 affixed to the shaft 14. All of the above-described structure is conventional in form and operation and is included merely to more clearly illustrate the operation of the invention.

The brake means of the invention includes a bracket member 36 secured to the inner wall of the housing 20 by means of a bolt 38 or the like. The bracket 36 is provided with a pin or stud 40 at one end thereof which supports a gear 42 in engagement with the gear 22. The relative positions of the various elements are shown best in FIGURE 2.

Figure 3:
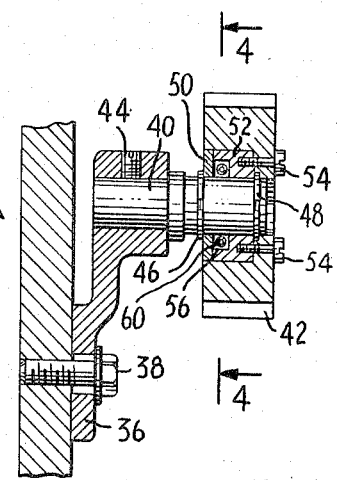
FIGURE 3 is a cross section through the braking device taken along the lines 3—3 of FIGURE 2; and, FIGURE 4 is a section taken along the lines 4—4 of FIGURE 3, and illustrating the details of the one-way braking device.
Figure 4:
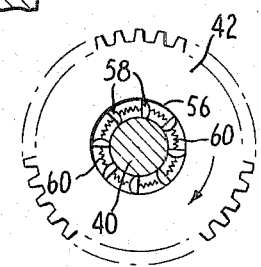

The gear 42 is mounted on the pin 40 to be rotatable in one direction only, such as may be effected by means of the one-way braking device illustrated in FIGURES 3 and 4.

Referring to FIGURE 3, it will be seen that the pin 40, which is held against rotation by means of set screw 44, extends beyond the bracket 36 to provide the inner race of an overrunning, or one-way clutch of the sprag type. A pair of snap rings 46, 48, are seated in grooves in the pin 40, between which are located the outer race members 50, 52 of the clutch. The outer race members 50, 52 are arranged to freely rotate about the pin 40. The gear 42 is attached, such as by screws 54, to the outer race member 52.

The outer race member 52 is provided with an inner shoulder which in conjunction with member 50, provides an annular channel 56 surrounding the pin 40. The sprags, or friction elements, of the clutch are disposed within the channel 56, as seen most clearly in FIGURE 4.

The friction elements of the clutch include a plurality of sprags or cams 58 having a D-shaped cross section and spaced apart within the channel 56 by means of compression springs 60. With the pin 40 fixed against rotation, the sprags 58 permit free rotation of the gear 42 in the direction of the arrow and function as supporting bearings therefor. However, substantially immediately upon any tendency of the gear 42 to rotate in the reverse direction, the sprags 58 effectively lock the outer races 50, 52 and consequently the gear 42, to the fixed pin 40. It will be seen therefore, that the illustrated arrangement permits rotation of the gear 42 only in the direction indicated by the arrow.

As used in the brake means of the present invention, the clutch mechanism described above functions as a one-way brake, rather than as a clutch, in that when engaged, it acts to prevent relative rotation between the associated elements. In its conventional environment, the clutch mechanism would couple the rotational motion of a driving member to a driven member to cause the later to rotate also.

From the foregoing, it will be apparent that with the gear 42 meshing with the driving gear 22, the shaft 14 will be free to rotate in the normal direction of rotation of the comb cylinder 10, corresponding to the direction of passage of the fleece through the combing machine. During such operation, the gear 42 freely rotates and does not affect the operation of the machine. When the application of power to the pinion 34 ceases, such as occurs when the machine is stopped, the action of the fleece upon the comb cylinder 10 is such as to tend to rotate the cylinder in the reverse direction. However, since the gear 42 cannot rotate in its reverse direction because of its mounting on the braking device, the gear 22, and consequently shaft 14 and comb cylinder 10 affixed thereto, become locked substantially immediately upon the reversal of rotation. The objectionable irregularities in the fleece discussed hereinabove are thereby avoided. Upon resumption of the application of driving power, the entire apparatus is free to rotate in its normal direction.

Figure 2:
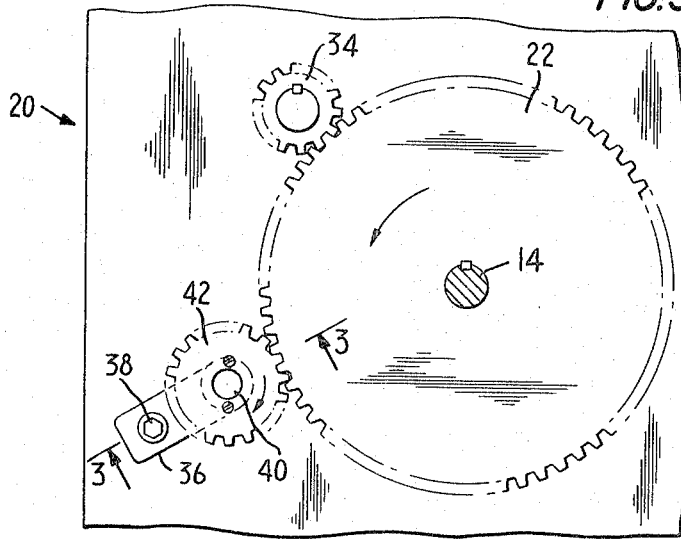
FIGURE 2 is a side view of the principal elements of the present invention taken along the lines 2—2 of FIGURE 1.

As a precaution against damaging either the combing machine or the brake means should the motor by chance drive the gear 22 and shaft 14 backwards under power, the brake means is mounted with the axis of the pin 40 somewhat above the straight line between the centers of bolt 38 and shaft 14, as seen in FIGURE 2. The single bolt mounting permits the brake means to be pushed up and away without damage when the gear 22 is so driven, and it may be remounted upon correction of the trouble causing the reverse drive.

The present invention affords a simple, yet positive means of eliminating reverse direction or backlash of rotating machine elements. Although illustrated and described in connection with the comb cylinder on a combing machine, it will be apparent that it is of equal application to other rotating machine elements. Furthermore, various types of overrunning or one-way clutch arrangements may be used as the braking device in place of the sprag clutch illustrated, without departing from the spirit and scope of the present invention. Accordingly, it is intended that the invention be limited only as set forth in the appended claims.

I claim:

1. In a combing machine having a comb cylinder mounted on a shaft for rotation therewith, a gear secured to said shaft, and driving means coupled to said gear to rotate said shaft and cylinder in a given direction, brake means for preventing reverse rotation of said shaft and cylinder comprising a bracket fastened at one end to the machine, a pin fixed against rotation at the other end of said bracket, a one-way braking device mounted on said pin, and an additional gear coupled to said braking device and engaging the gear secured to said shaft, the braking device being disposed to enable free rotation of said additional gear when said shaft is rotating in said given direction and to lock said additional gear against rotation when said shaft tends to rotate in a direction opposite to said given direction.

2. Apparatus according to claim 1 above wherein the bracket is fastened to the machine by means enabling pivoting of said entire brake means upon application to said additional gear of rotational force above a predetermined value in the locking direction.

3. Apparatus according to claim 1 above wherein said one-way braking device is a brake of the sprag type.

4. A brake apparatus according to claim 2 above wherein said element is a brake of the sprag type.

5. For use in combination with a member normally rotating in a predetermined direction, brake means for preventing backlash comprising an element rotatable in one direction only, non-slip means coupling said element to said member for rotation in said one direction in response to rotation of said member in said given direction, and means normally supporting said element in coupling relation to said member and responsive to a predetermined value of rotational force applied to said element by said member in a direction opposite to said one direction to disengage said element from said member.

References Cited by the Examiner
UNITED STATES PATENTS

| | | | |
|---|---|---|---|
| 1,775,832 | 9/1930 | Schench | 192—27 |
| 1,979,509 | 11/1934 | Van Hille | 19—115 |
| 2,372,026 | 3/1945 | Smith. | |
| 2,386,013 | 10/1945 | Swenson | 192—45.1 |
| 2,695,089 | 11/1954 | Unk et al. | 192—150 |
| 2,707,446 | 5/1955 | McCutchen | 112—79 |
| 2,766,863 | 10/1956 | Berg | 192—41 |

FOREIGN PATENTS 582,629   9/1958   Italy.

DAVID J. WILLIAMOWSKY, Primary Examiner.

FRANK SUSKO, ROBERT C. RIORDON, Examiners.

D. C. CHAMPION, Assistant Examiner.

UNITED STATES PATENT OFFICE
CERTIFICATE OF CORRECTION

Patent No. 3,302,759                                      February 7, 1967

John H. Nydam

It is hereby certified that error appears in the above numbered patent requiring correction and that the said Letters Patent should read as corrected below.

Column 2, line 69, for "later" read -- latter --; column 4, line 17, for the claim reference numeral "2" read -- 5 --.

Signed and sealed this 17th day of October 1967.

(SEAL)
Attest:

Edward M. Fletcher, Jr.

Attesting Officer

EDWARD J. BRENNER

Commissioner of Patents